(12) United States Patent
Kudo et al.

(10) Patent No.: US 7,435,946 B2
(45) Date of Patent: Oct. 14, 2008

(54) MARK DETECTOR USING MULTIPLE LIGHT BEAMS FOR USE IN A DISPLACEMENT DETECTOR AND AN IMAGE FORMING APPARATUS

(75) Inventors: Koichi Kudo, Yokohama (JP); Hideyuki Takayama, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/581,731

(22) Filed: Oct. 17, 2006

(65) Prior Publication Data

US 2007/0108376 A1    May 17, 2007

(30) Foreign Application Priority Data

| Oct. 17, 2005 | (JP) | ............................. 2005-301308 |
| Oct. 26, 2005 | (JP) | ............................. 2005-310907 |
| Sep. 13, 2006 | (JP) | ............................. 2006-247469 |

(51) Int. Cl.
*G01D 5/34* (2006.01)
*G01J 9/00* (2006.01)

(52) U.S. Cl. ........................... 250/231.13; 250/231.14; 250/231.17; 250/223 R; 356/616

(58) Field of Classification Search ................................ 250/231.13–231.18, 221, 221.1, 223 R; 356/616–617; 399/162, 165.301, 371, 372; 347/116, 177, 347/178
See application file for complete search history.

(56) References Cited

U.S. PATENT DOCUMENTS

| 5,896,472 | A * | 4/1999 | Takayama ................... 382/287 |
| 7,129,858 | B2 * | 10/2006 | Ferran et al. .................. 341/11 |
| 2002/0021450 | A1 * | 2/2002 | Aoki ........................... 356/499 |
| 2004/0022557 | A1 * | 2/2004 | Kudo ........................... 399/167 |
| 2004/0130646 | A1 * | 7/2004 | Terada .......................... 348/335 |
| 2004/0217268 | A1 * | 11/2004 | Tobiason et al. .......... 250/231.13 |
| 2004/0217628 | A1 * | 11/2004 | Neunteufel et al. ..... 296/190.04 |
| 2006/0097141 | A1 * | 5/2006 | Kiriyama et al. ........ 250/231.13 |

FOREIGN PATENT DOCUMENTS

| JP | 6-263281 A | 9/1994 |
| JP | 09-114348 A | 5/1997 |
| JP | 2005-91912 A | 4/2005 |
| JP | 2005-99728 A | 4/2005 |
| JP | 2005-181090 A | 7/2005 |
| JP | 2005-345359 A | 12/2005 |
| JP | 2005-350195 A | 12/2005 |
| JP | 2006-10855 A | 1/2006 |
| JP | 2006-17615 A | 1/2006 |
| JP | 2006-17975 A | 1/2006 |
| JP | 2006-23465 A | 1/2006 |
| JP | 2006-38943 A | 2/2006 |
| JP | 2006-113825 A | 4/2006 |
| JP | 2006-139029 A | 6/2006 |
| JP | 2006-139214 A | 6/2006 |
| JP | 2006-139216 A | 6/2006 |
| JP | 2006-153676 A | 6/2006 |
| JP | 2006-160512 A | 6/2006 |

* cited by examiner

*Primary Examiner*—Davienne Monbleau
(74) *Attorney, Agent, or Firm*—Dickstein Shapiro LLP

(57) ABSTRACT

A mark detector to detect a plurality of marks which are arranged in a predetermined cycle on a moving member, such as a photo conductor belt, a transfer belt, a paper conveyance belt, a photo conductor drum, a transfer drum, etc. especially in an image forming apparatus, has an optical head including a light source to irradiate a light beam, a beam shaping device to shape the light beam, and a photo acceptor to accept light from the marks. Light beams on the marks from the light source have different positions shifted within a half mark cycle of each other on the marks. This increases accuracy and stability of controlling a motion of the moving member.

15 Claims, 18 Drawing Sheets

MARK DETECTOR USING MULTIPLE LIGHT BEAMS FOR USE IN A DISPLACEMENT DETECTOR AND AN IMAGE FORMING APPARATUS

BACKGROUND OF THE INVENTION

1. Field of the Invention

The present invention generally relates to an image forming apparatus such as a printer, a copying machine, and a facsimile, and more particularly to a displacement detector and a mark detector which are capable of increasing accuracy and stability of a rotation or displacement of a rotating member, such as a photo conductor belt, a transfer belt, a paper conveyance belt, a photo conductor drum, a transfer drum, etc.

2. Discussion of the Background

A background image forming apparatus such as a printer, a copying machine, and a facsimile includes a rotating member, such as a photo conductor belt, a transfer belt, a paper conveyance belt, a photo conductor drum, a transfer drum. In the image forming apparatus, to realize high accuracy positioning of an image on a transfer member which is a rotating member or a conveyed member, a rotation or displacement of the transfer member should be controlled with high accuracy. But it is difficult to maintain high accuracy in positioning an image, because the amount of rotation of the rotating member varies easily in many reasons. Especially in a color image forming apparatus, a variation of a rotation of a rotating member causes a displacement between the colors, so that a position of the image in each color does not overlap correctly.

To reduce a positioning error of a rotating member, in one example, a rotary encoder is provided on the axis of a rotating member to indirectly measure a surface velocity of the rotating member. A speed of a driving motor is controlled according to the measured speed of the rotating member. However, it is difficult to maintain high accuracy in the rotation of the rotating member, because a decentering of the rotating member easily causes a variation of a surface velocity of the rotating member, even though the driving motor is controlled according to the detected speed of the rotation of the rotating member.

When an endless belt is used as a photo conductor belt or a middle transfer belt, variation in the thickness of the belt, decentering of a roller for rotating the belt, or a variation in the speed of a driving motor for conveying the belt causes a speed variation of the belt. Especially in a color image forming apparatus, a positioning error by the speed variation of the belt forms a waveform which has two or more frequency components during one rotation of the belt as shown in FIG. 1. FIG. 1 is a graph showing relations of time and a positioning error. The speed variation of the belt causes a displacement between the colors, such as cyan (C), magenta (M), yellow (Y), black (K), so that a position of the image in each color does not overlap correctly. Therefore, a speed variation of a belt causes lower image quality, such as bad positioning between colors, difference of a color, or other undesirable qualities.

To reduce speed variation of a belt, in one example, a rotary encoder is provided on the axis of a rotating member for driving the belt to calculate the amount of the rotation and an average speed of the rotating member using output pulses of the rotary encoder. Driving motor speed is controlled according to the calculated results. However, it is difficult to maintain high accuracy in the rotation of the rotating member because the number of the rotations and the average speed of the rotating member is calculated and obtained indirectly.

To detect the number of the rotations of the rotating member directly, in one example, a reflective mark is provided on a surface of a belt. A belt conveyance unit controls the rotation of the belt with a feedback control calculating belt surface speed by using binary pulse intervals which is acquired by sensing the reflective marks.

However, a belt used as a rotating member for image forming is easily deformable and has a deviation in thickness. Therefore, when the belt is rotating, a variation of gap or angle between a mark on the belt and a sensor for detecting the mark may occur. This variation may cause variation in the amount of light accepted by the sensor. FIG. 2 is a graph showing relations of time and a mark detection signal, and time and a binary signal of the mark detection signal. As shown in FIG. 2, the mark detection signal with the sensor may have a variation in amplitude. A binary signal, which is acquired by a comparison of the amplitude limit with a reference voltage 0 V and the mark detection signal, may have a variation in its pulse intervals. Even if a high pass filter is used to remove offset signals caused by fluctuation in the rotating member speed, the electric signal may not be detected due to decline in the electric signal because the speed may not be within the pass band of the high pass filter.

SUMMARY OF THE INVENTION

A novel mark detector to detect a plurality of marks which are arranged in a predetermined cycle on a moving member, such as a photo conductor belt, a transfer belt, a paper conveyance belt, a photo conductor drum, a transfer drum, etc. especially in an image forming apparatus, has an optical head including a light source to irradiate a light beam, a beam shaping device to shape the light beam, and a photo acceptor to accept light from the marks. Light beams onto the marks from the light source and have different positions, shifted within a half mark cycle of each other on the marks. This increases accuracy and stability for controlling the motion of the moving member.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
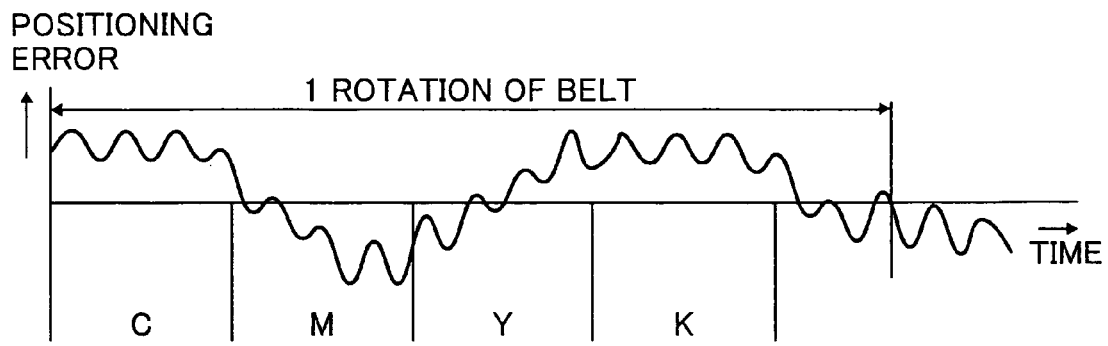
FIG. 1 is a graph showing relations of time and a positioning error of a background image forming apparatus.
Figure 2:
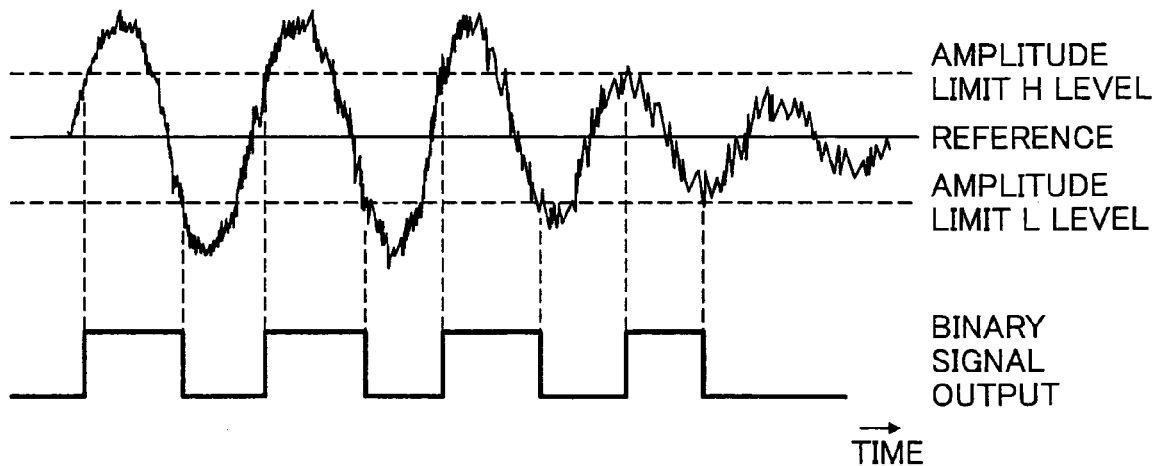
FIG. 2 is a graph showing relations of time and a mark detection signal, and time and a binary signal of the mark detection signal of a background image forming apparatus.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 3, an image forming apparatus 1 according to an exemplary embodiment of the present invention is explained.

Figure 3:
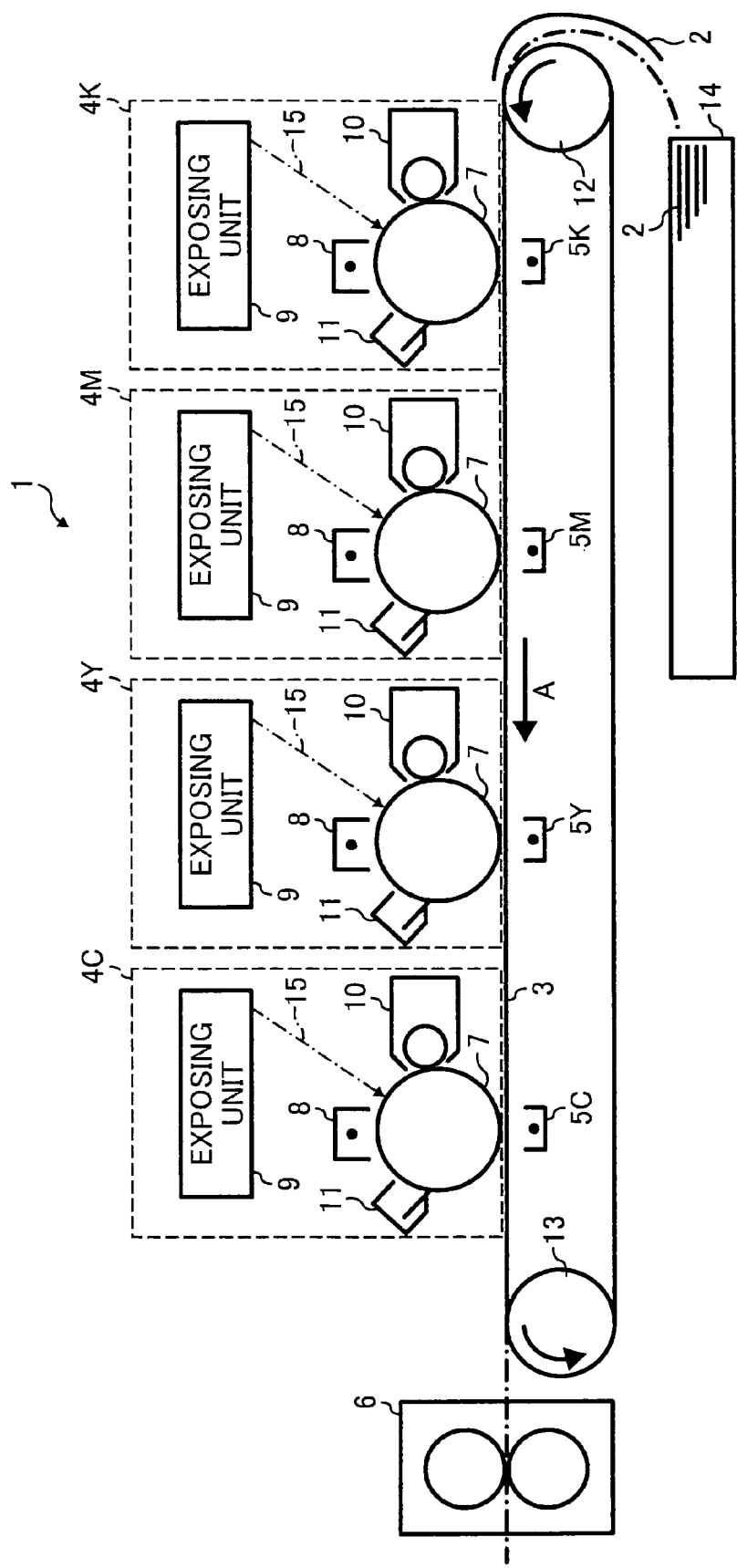
FIG. 3 is an illustration illustrating an exemplary configuration of an image forming apparatus according to an exemplary embodiment of the present invention.

FIG. 3 is an illustration illustrating an exemplary configuration of an image forming apparatus according to an exemplary embodiment of the present invention. An image forming apparatus 1 includes image forming units 4K, 4M, 4Y, and 4C corresponding to each color, such as black, magenta, yellow, cyan, respectively, along a conveyance belt 3 and transfer units 5K, 5M, 5Y, and 5C across the conveyance belt 3, respectively, and a fixing unit 6. The conveyance belt 3 conveys a recording paper 2.

Each of the image forming units 4K, 4M, 4Y, and 4C comprises a photo conductor drum 7 as an image carrier, and a charging unit 8, an exposing unit 9, a developing unit 10 arranged around the photo conductor drum 7, and a photo conductor cleaner 11. The exposing unit 9 uses a laser scanner that reflects the laser light from a laser light source by using a polygon mirror and outputs the light through an fθ lens or with a reflection at a deflection mirror, etc.

A driving roller 12 rotates the conveyance belt 3, which is an endless belt and a driven roller 13, in a counter clockwise direction. The recording paper 2 is contained in a recording paper tray 14 under the conveyance belt 3. The recording paper 2 is conveyed by the conveyance belt 3 with electrostatic adsorption and an image is transferred to be formed in each of the image forming units 4K, 4M, 4Y, and 4C.

In a first step of making a color image, the charging unit 8 charges a surface of the photo conductor drum 7 evenly in the image forming unit 4K. In a second step, the exposing unit 9 forms an electrostatic image corresponding to a black image using a laser light. In a third step, the developing unit 10 develops the electrostatic image to form a black toner image on the photo conductor drum 7. In a fourth step, the black toner image on the photo conductor drum 7 is transferred by the transfer unit 5K onto the recording paper 2 conveyed by the conveyance belt 3 at a transferring position where the recording paper touches the photo conductor drum 7 to form a black image on the recording paper 2. In a fifth step, a waste toner on the photo conductor 7 is cleaned by the photo conductor cleaner 11 to set stand-by for forming a subsequent image.

The recording paper 2, which has a black toner image transferred by the image forming unit 4K, is conveyed to the image forming unit 4M, where a magenta toner image is formed over the black toner image on the recording paper 2, as described above with respect to the formation of the black toner image. A yellow toner image and a cyan toner image are similarly formed, so that a full color image may be formed. The recording paper 2, which has the full color image, is conveyed into the fixing unit 6 by the conveyance belt 3. The full color image is fixed onto the recording paper 2 by heat and pressure, and the recording paper 2 is ejected.

Figure 4:
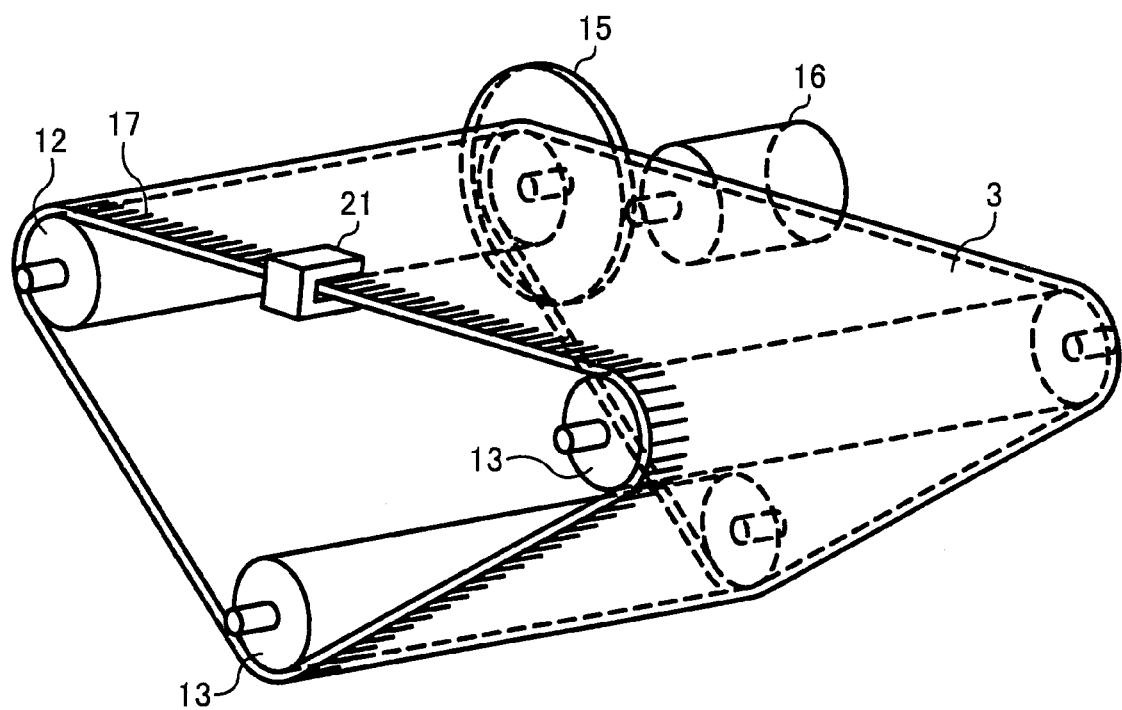
FIG. 4 is a perspective diagram of the rotating mechanism of a conveyance belt of the image forming apparatus of FIG. 3.
Figure 5:
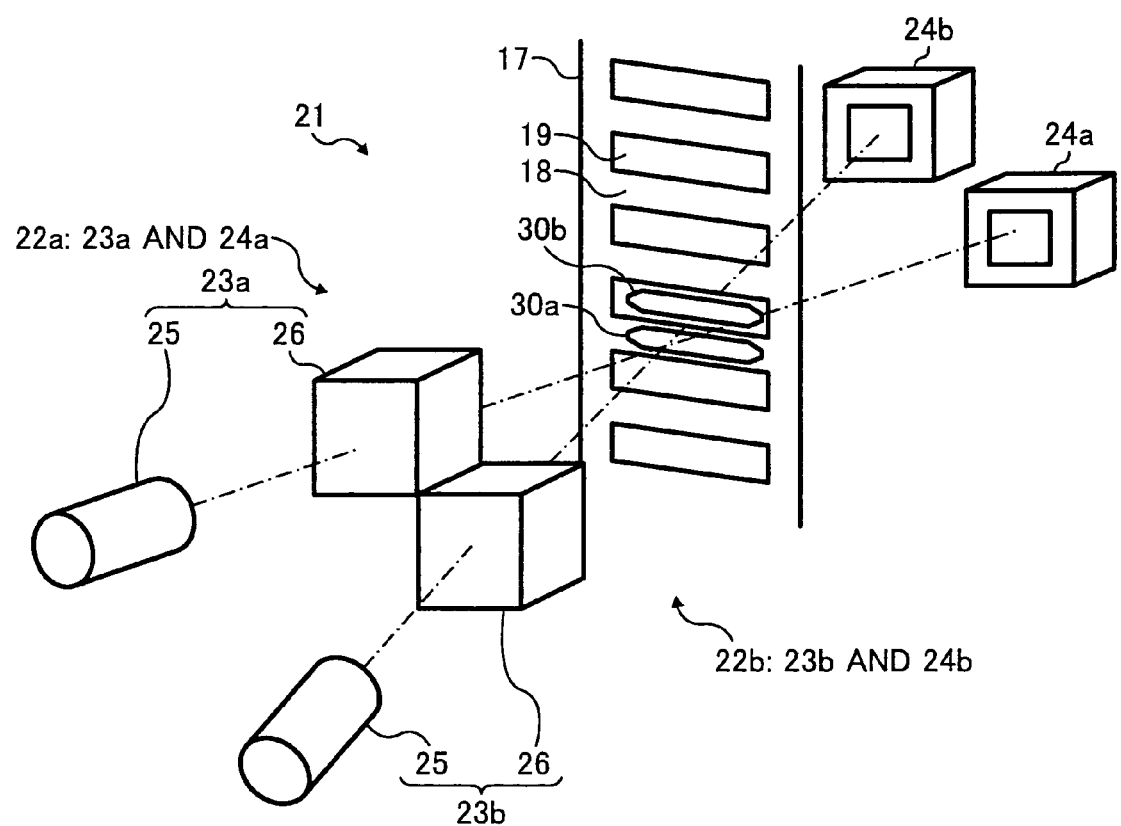
FIG. 5 is a magnified view of a mark detector and a scale of the rotating mechanism of FIG. 4.

FIG. 4 is a perspective diagram of the rotating mechanism of a conveyance belt 3 of the image forming apparatus of FIG. 3. As shown in the perspective diagram of FIG. 4, a drive motor 16 drives reduction gears 15 and the reduction gears transfer to rotate the driving roller 12 to rotate the conveyance belt 3. The conveyance belt has a scale 17 on an end surface. A mark detector 21 detects the scale 17. FIG. 5 is a magnified view of the mark detector 21 and the scale 17 of FIG. 4. A reflective mark 18 and a slit 19 are located in a line alternately in a predetermined cycle in a rotating direction. When detecting a reflective light, the reflective mark 18 functions as a reference mark, and when detecting light penetration, a slit 19 functions as a reference mark. When detecting a reflective light, a printing pattern having different colors, such as white and black, may be used as the reflective mark 18. Alternatively, aluminum vapor deposition film having reflective patterns may be used as the reflective mark 18, because the reflective mark 18 and the slit 19 may be identified by a variation of a reflectance factor and a penetration factor. Thus, the reflective mark 18 and the slit 19 may produce a single or a continuous reflectance change according to the number of the reflective marks 18 and the slits 19.

Figure 6:
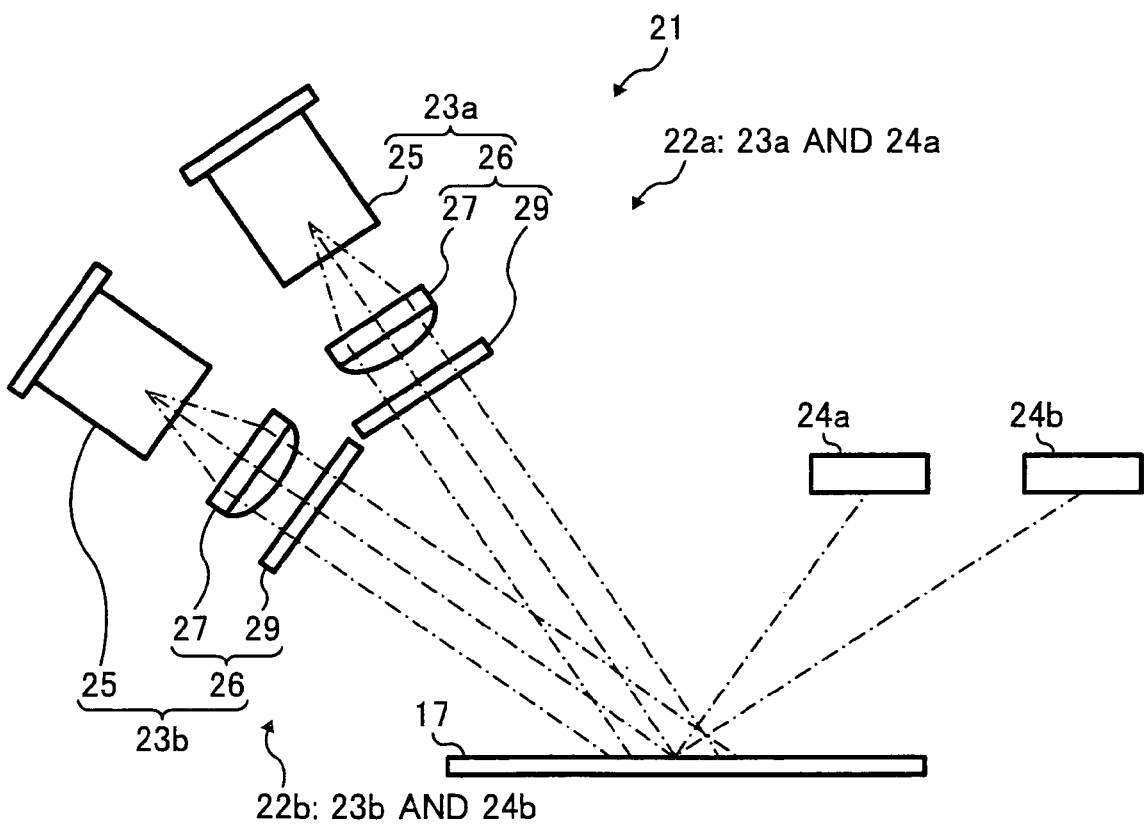
FIG. 6 illustrates a configuration of the mark detector and the scale of the rotating mechanism of FIG. 4.

The mark detector 21 is separated from the conveyance belt 3 by a predetermined distance and faces the scale 17. FIG. 6 illustrates a configuration of the mark detector 21 and the scale 17 of FIG. 4 using a reflective type. This mark detector 21 has, for example, two sets of optical head parts, an optical head part 22a and an optical head part 22b as shown in FIGS. 5 and 6. The optical head part 22a has an illuminator 23a and a photo acceptor 24a. The optical head part 22b has an illuminator 23b and a photo acceptor 24b.

Figure 7A:
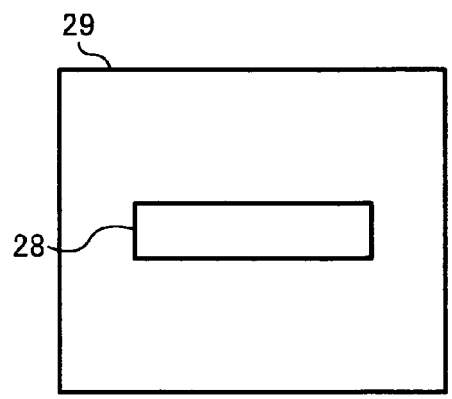
FIG. 7A illustrates a fixed mask used in the mark detector of FIG. 4.
Figure 7B:
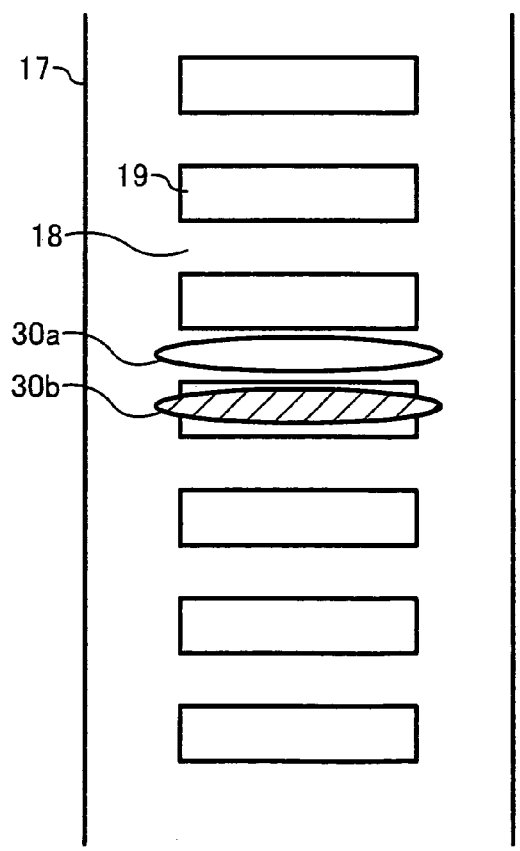
FIG. 7B illustrates an irradiated light beam spot on the scale of FIG. 4.

Each of the illuminators 23a and 23b has a light source 25 and a beam shaping device 26. A light emitting diode (LED) is used as the light source 25. A semiconductor laser, an electric bulb, or other light emitting device may also be used as the light source 25. Since it is better to use a good parallel light beam, it is preferable to use a light source that has a small luminescence area, such as a semiconductor laser or a point light source LED. The beam shaping device 26 condenses the light beam output from the light source 25, and forms a desired light beam. FIG. 7A illustrates a fixed mask used in the mark detector of FIG. 4. FIG. 7B illustrates an irradiated light beam spot on a scale of FIG. 4. The beam shaping device 26 includes a collimating lens 27 as shown in FIG. 6 and a fixed mask 29 having a slit 28 as shown in FIG. 7A. A light beam from the light source 25 is condensed to form a parallel beam through the collimating lens 27 and beam-shaped by the fixed mask 29, for example, to form light beam spots 30a and 30b on the scale 17, as shown in FIG. 7B.

Figure 8:
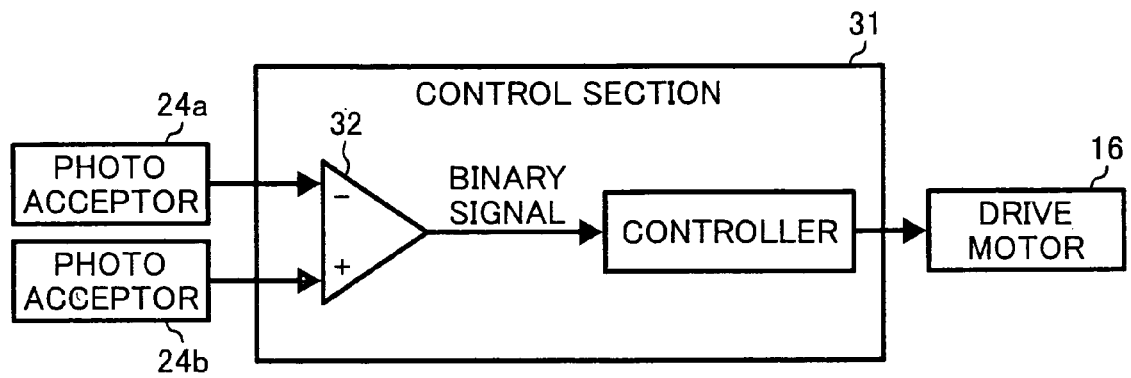
FIG. 8 illustrates a block diagram illustrating a configuration of a controlling section of a motor driving of the rotating mechanism of FIG. 4.

Each of the photo acceptors 24a and 24b has a photo-diode or a photo-transistor, etc. Each of the photo acceptors 24a and 24b either accepts a light that penetrates the slit 19 of a scale 17, as shown in FIG. 5, or accepts a light that reflects at the reflective mark 18 on a scale 17, as shown in FIG. 6. Photoelectric transferring is performed with the photo acceptors 24a and 24b so that a mark detection signal may be acquired. FIG. 8 is a block diagram illustrating a configuration of a control section of a motor driving of FIG. 4. Each of the photo acceptors 24a and 24b is connected to a comparison device 32, such as an amplifier or a comparator of a control section 31 of a drive motor 16, as shown in the block diagram of FIG. 8. In addition, a lens may be provided in the photo acceptors 24a and 24b which condenses the light that either penetrates the slit 19 of a scale 17 or condenses the light reflected by the reflective mark 18.

The illuminators 23a and 23b should be provided in a plane that intersects perpendicularly to a moving direction of the conveyance belt 3 so that each of light axis of the illuminators 23a and 23b may lean against a surface of the conveyance belt 3. Providing the illuminators 23a and 23b in a plane that intersects perpendicularly to a moving direction of the conveyance belt 3 may realize high accuracy mark detecting because a light beam from the illuminators 23a and 23b onto the scale 17 is perpendicular to the moving direction of the conveyance belt 3 and an observation position does not change, even if there is a gap variation between each of the illuminators 23a and 23b and the conveyance belt 3.

The optical head part 22a and the optical head part 22b are provided so that a half cycle distance of reflective marks 18 may pass between the beam spot 30a and the beam spot 30b on the surface of the scale 17 in the moving direction.

Figure 9:
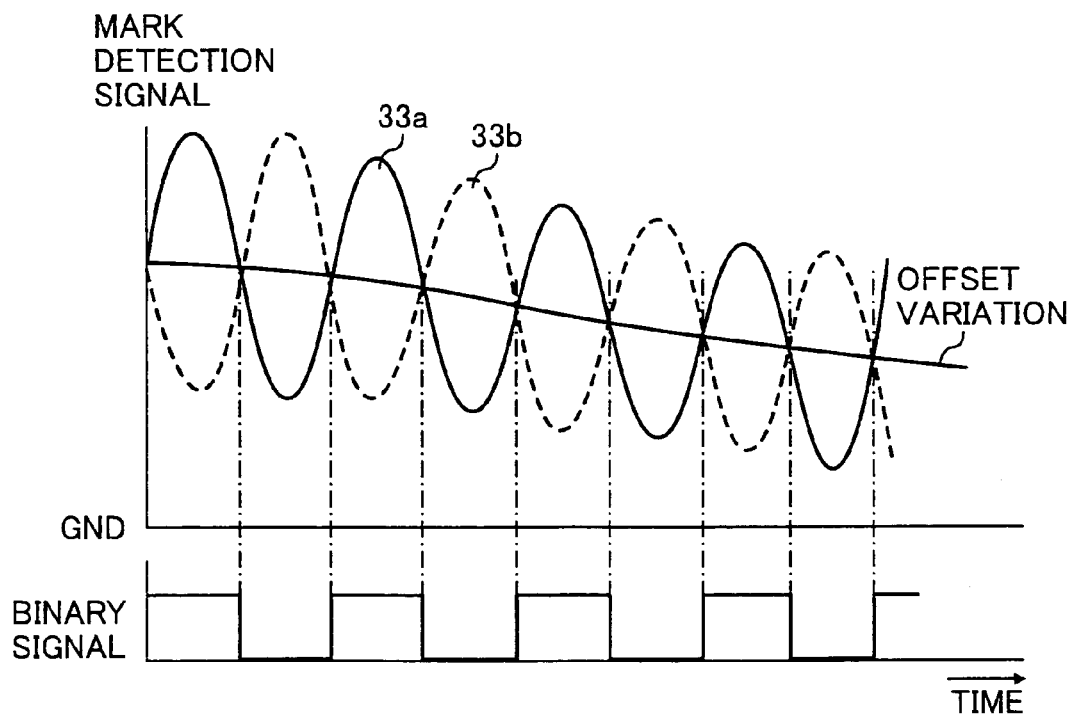
FIG. 9 is a graph showing relations of time and a mark detection signal, and time and a binary signal in FIG. 8.

FIG. 9 is a graph showing relations of time and a mark detection signal, and time and a binary signal in FIG. 8. A mark detection signal 33a from the photo acceptor 24a and a mark detection signal 33b from the photo acceptor 24b are 180 degrees phase shifted, as shown in FIG. 9. The mark detection signals 33a and 33b are transferred into binary signals using the comparison device 32, which is used for controlling the drive motor 16.

Since the 180 degrees phase shifted mark detection signals 33a and 33b are acquired and compared by the comparison device 32, the mark detection signals 33a and 33b may change a threshold of a binary signal in the same voltage like the binary signal as shown in FIG. 9. For example, when the scale 17 has a large reflective unevenness, the mark detection signals 33a and 33b may have an offset variation. But the mark detection signals 33a and 33b come from a penetration light or a reflective light from the adjoining marks on the scale 17, and the mark detection signals 33a and 33b may have almost the same level offset variations as convolutions, as shown in FIG. 9. Therefore, a threshold of a binary signal is almost a half amplitude of the mark detection signals 33a and 33b, and a high accuracy binary signal without an offset variation maybe obtained.

In addition, since the 180 degrees phase shifted mark detection signals 33a and 33b are acquired from an area on the scale 17, a crack or dirty on the scale 17 has little effect on the mark detection signals 33a and 33b such that an offset variation is reduced. Furthermore, since each of light beams from the illuminators 23a and 23b has a different incidence light angle to the scale 17, signal interference may be prevented, so that mark detecting may be highly accurate.

Not only a 180 degree phase shift between the plurality of beams may be chosen, but also any arbitrary angle, such as 90 degrees, 120 degrees, etc.

Figure 10A:
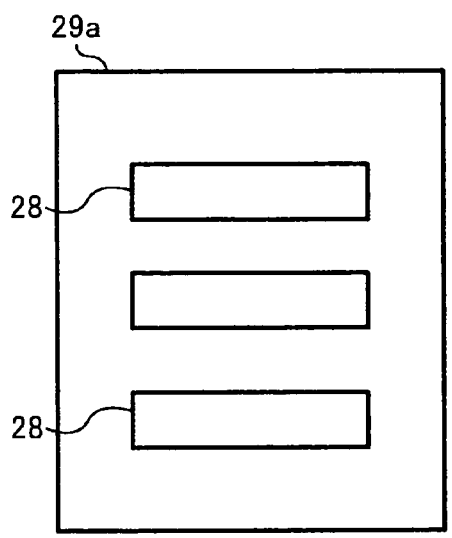
FIG. 10A illustrates another fixed mask used in the mark detector of FIG. 4.
Figure 10B:
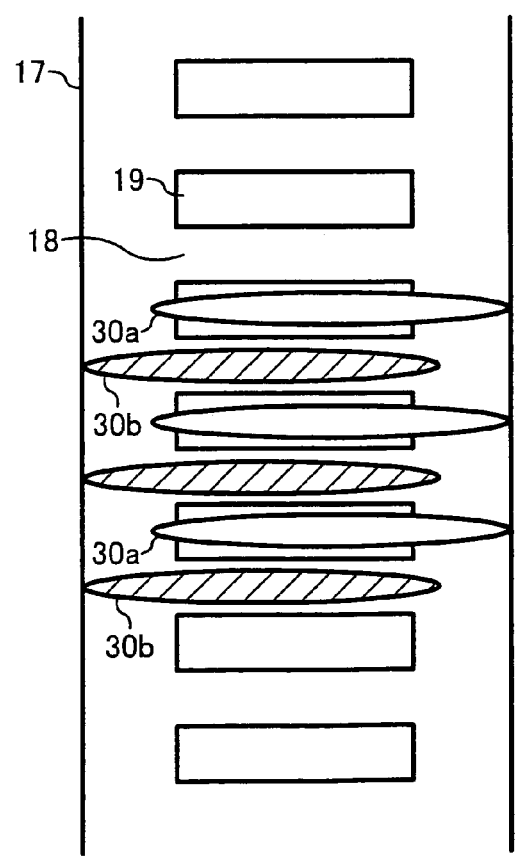
FIG. 10B illustrates the irradiated light beam spots on the scale of FIG. 4.

FIG. 10A illustrates another fixed mask used in a mark detector of FIG. 4. FIG. 10B illustrates irradiated light beam spots on a scale of FIG. 4 using the fixed mask in FIG. 10A. As shown in FIG. 10A, a plurality of slits 28 may be provided in a fixed mask 29a. As shown in FIG. 10B, a plurality of light beam spots 30a and 30b may be irradiated using the fixed mask 29a shown in FIG. 10A so that mark detection signals having a phase shift are acquired. Also in this case, two beam patterns on the scale 17 from the illuminators 23a and 23b do not need to be shifted by the size of the beam pattern, but it may be shifted by an arbitrary phase difference.

Figure 11:
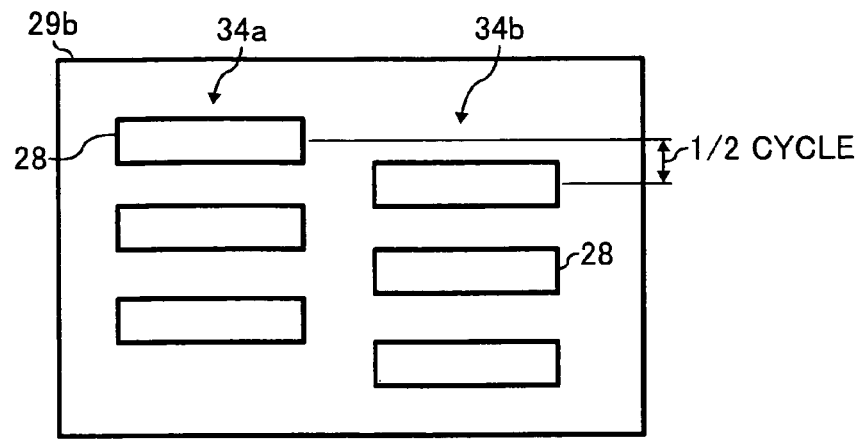
FIG. 11 illustrates another fixed mask used in the mark detector of FIG. 4.
Figure 12:
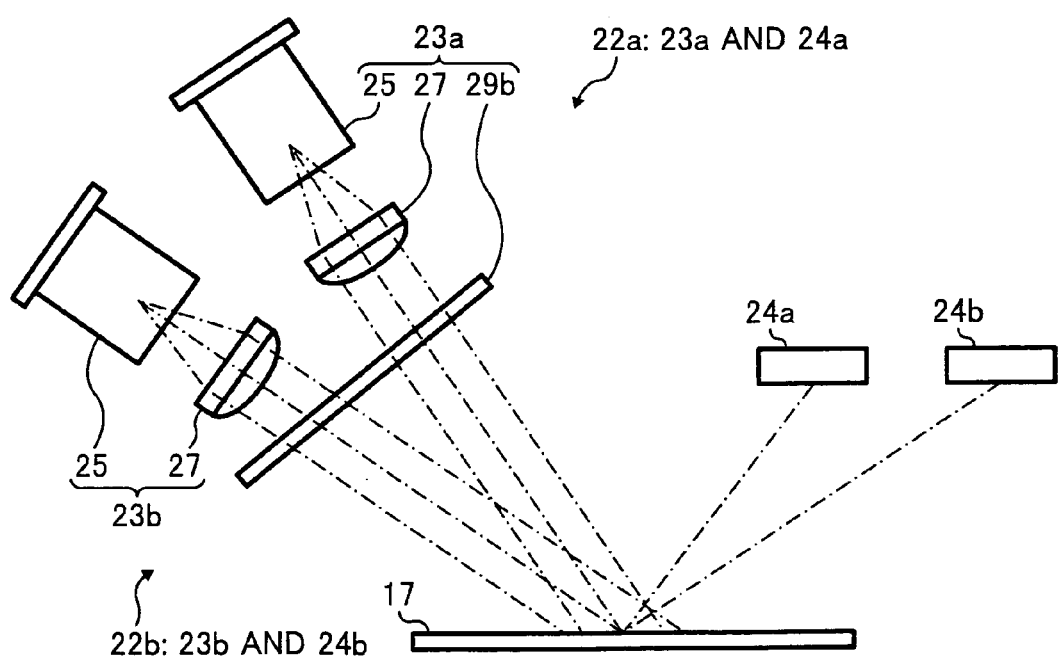
FIG. 12 illustrates another configuration of the mark detector and the scale of FIG. 4.

FIG. 11 illustrates another fixed mask used in a mark detector of FIG. 4. FIG. 12 illustrates another configuration of a mark detector 21 and the scale 17 of FIG. 4. As shown in FIG. 11, a penetration area 34a having slits 28 through which a beam 30a penetrates and a penetration area 34b having slits 28 through which a beam 30b penetrates are provided separately in a fixed mask 29b. As shown in FIG. 12, the fixed mask 29b may be used in common as a beam shaping device 26 of the illuminators 23a and 23b. This common use of the fixed mask 29b may reduce the number of complete parts of the mark detector 21 and make it easy to adjust a phase at the time of assembly.

Figure 13:
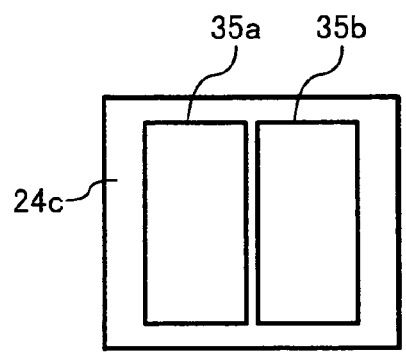
FIG. 13 illustrates another configuration of a photo acceptor in the mark detector of FIG. 4.

FIG. 13 illustrates another configuration of a photo acceptor in a mark detector of FIG. 4. As shown in FIG. 13, two photo accepting areas 35a and 35b may be provided in a photo acceptor 24c, and the photo acceptor 24c may be used in common in the optical head parts 22a and 22b.

Figure 14:
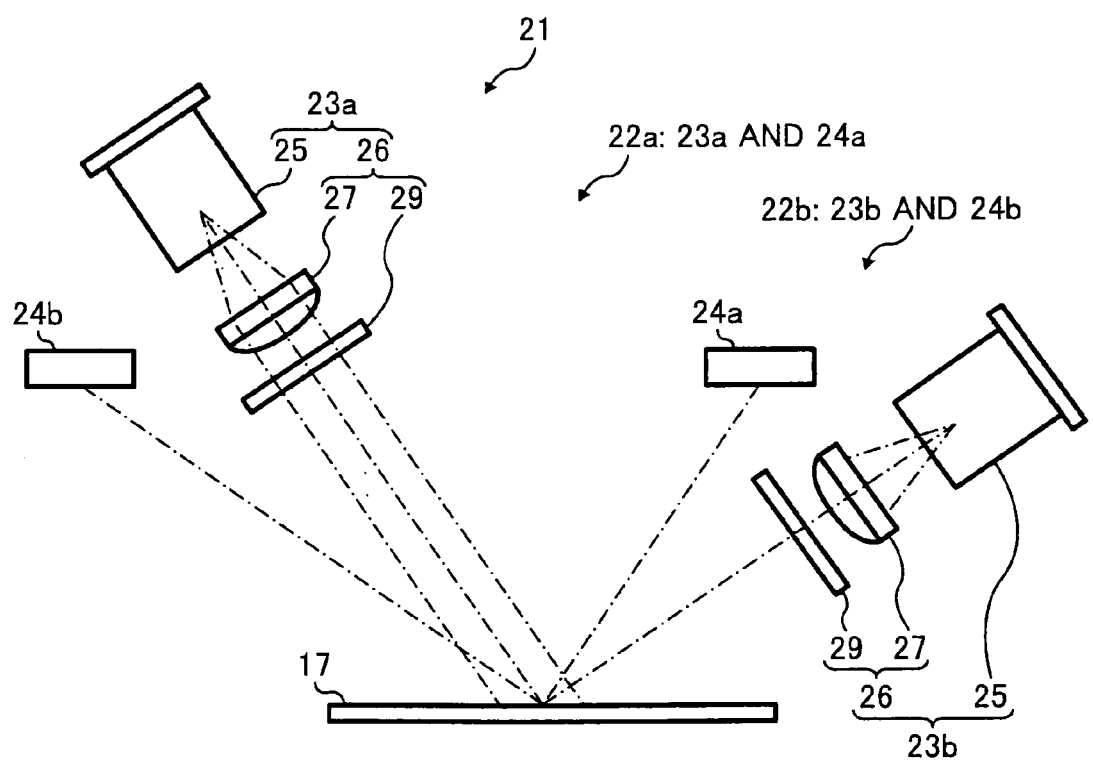
FIG. 14 illustrates another configuration of the mark detector and the scale of FIG. 4.

FIG. 14 illustrates another configuration of a mark detector 21 and the scale 17 of FIG. 4. The illuminators 23a and 23b may be arranged approximately axisymmetric to each other above the surface of the scale 17, as shown in FIG. 14. Therefore, a photo acceptor 24a of an optical head part 22a may be arranged near the illuminator 23b, and a photo acceptor 24b of an optical head part 22b may be arranged near the illuminator 23a. This arrangement may prevent the occurrence of an interference signal between a mark detection signal 33a and a mark detection signal 33b due to light scattering into the photo acceptors 24a and 24b.

Figure 15:
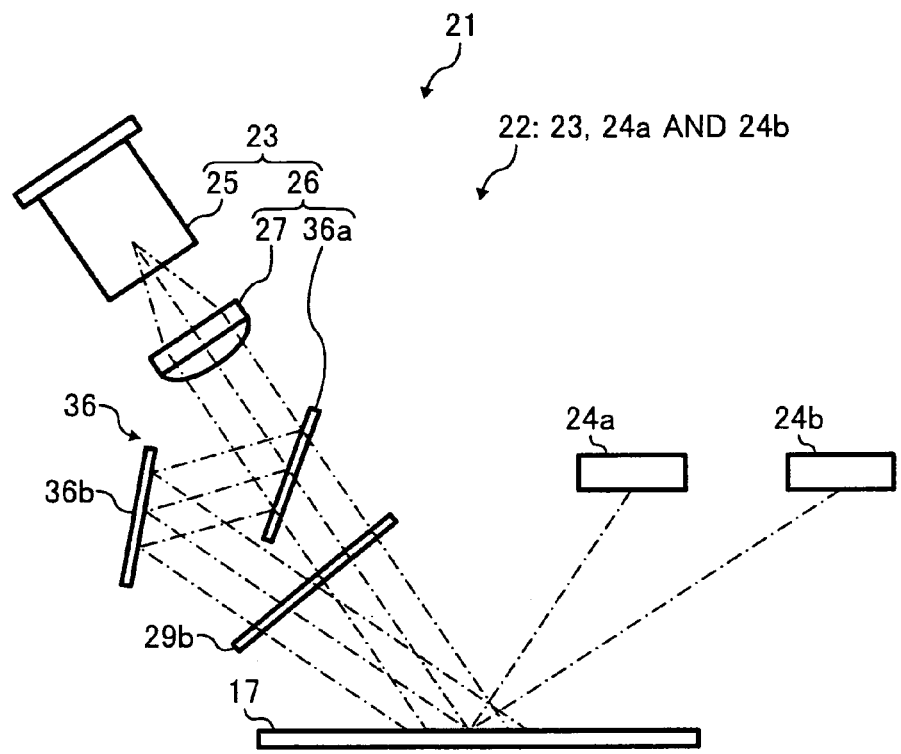
FIG. 15 illustrates another configuration of the mark detector and the scale of FIG. 4.

FIG. 15 illustrates another configuration of a mark detector 21 and the scale 17 of FIG. 4. As shown in FIG. 15, an optical dividing element 36, such as a pair of half mirrors 36a and 36b, may be provided between a light source and the scale 17 as a part of a beam shaping device 26 using only one illuminator 23.

Figure 16:
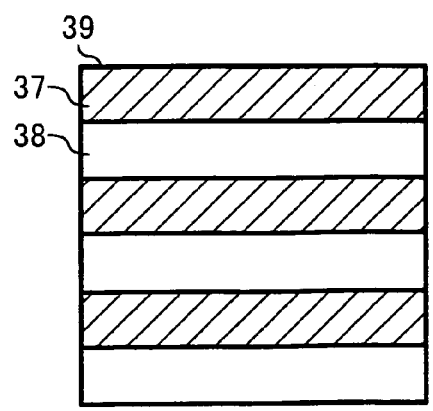
FIG. 16 illustrates another fixed mask used in the mark detector of FIG. 4.
Figure 17:
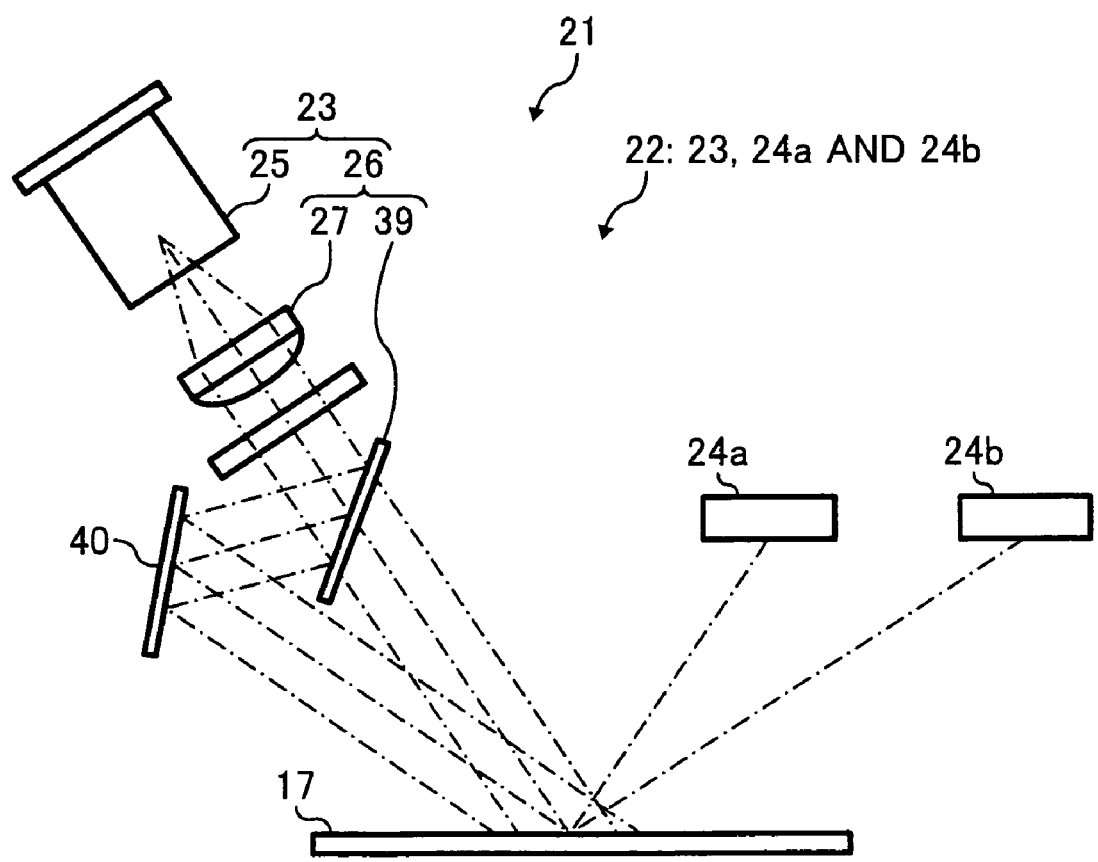
FIG. 17 illustrates another configuration of the mark detector and the scale of FIG. 4.

FIG. 16 illustrates another fixed mask used in the mark detector of FIG. 4. FIG. 17 illustrates another configuration of a mark detector 21 and the scale 17 of FIG. 4. As shown in FIGS. 16 and 17, a reflection and penetration mask 39 and a mirror 40 may be provided between a light source and the scale 17 as a part of a beam shaping device 26, which has two or more reflective mark areas 37 and penetration slit areas 38 having a predetermined pitch. The mirror 40 reflects a reflective light from the reflection and penetration mask 39, so that only one illuminator 23 may be used. Therefore, a light beam from the light source 25 may be effectively used.

Figure 18:
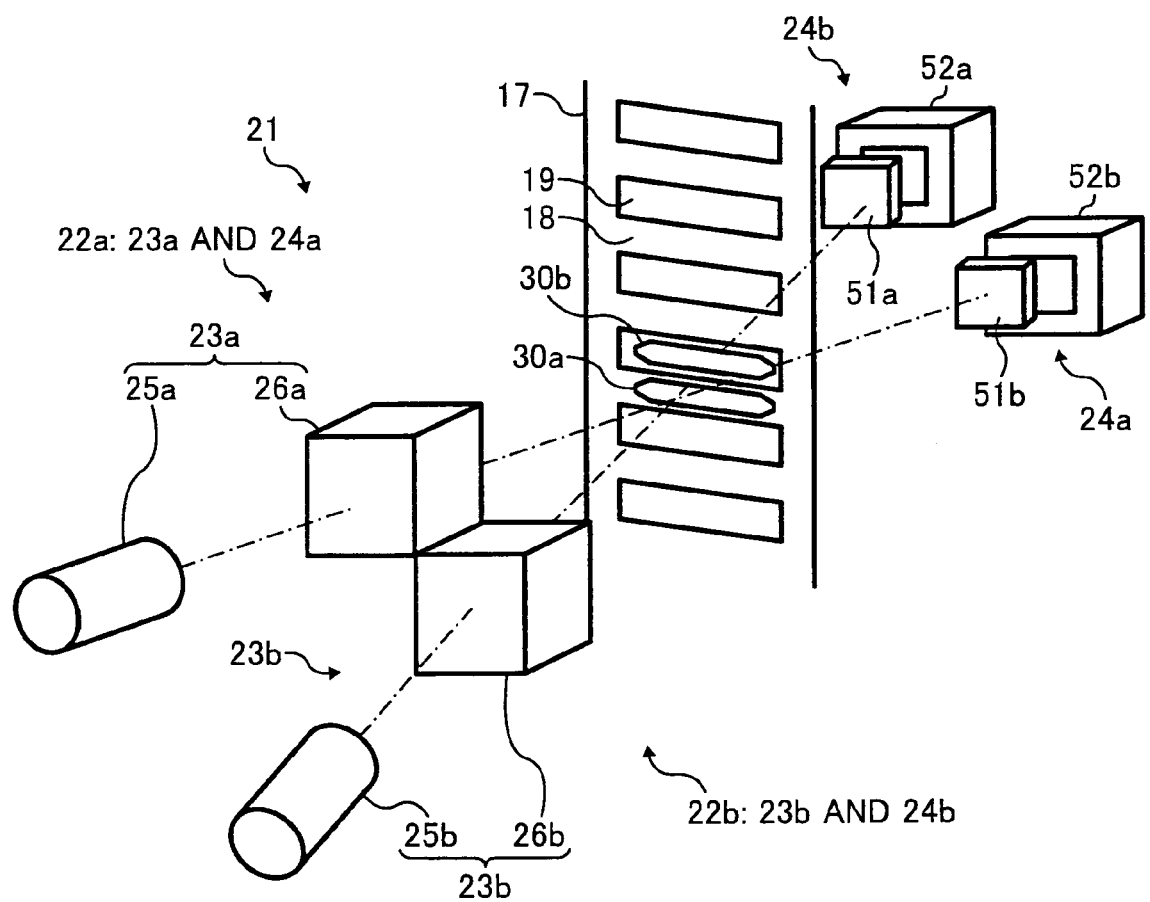
FIG. 18 illustrates another configuration of the mark detector and the scale of FIG. 4.

FIG. 18 illustrates another configuration of a mark detector 21 and the scale 17 of FIG. 4. A reflective mark 18 and a slit 19 are alternately located in a line in a predetermined cycle in a rotating direction. When detecting a reflective light, the reflective mark 18 functions as a reference mark, and when detecting a penetration light, a slit 19 functions as a reference mark. When detecting a reflective light, a printing pattern having different colors, such as white and black, may be used as the reflective mark 18. Alternatively, aluminum vapor deposition film having reflective patterns may be used as the reflective mark 18, because the reflective mark 18 and the slit 19 may be identified by a variation in a reflectance factor and a penetration factor. Thus, the reflective mark 18 and the slit 19 produce a single or a continuous reflectance change according to the number of the reflective marks 18 and the slits 19.

Figure 19:
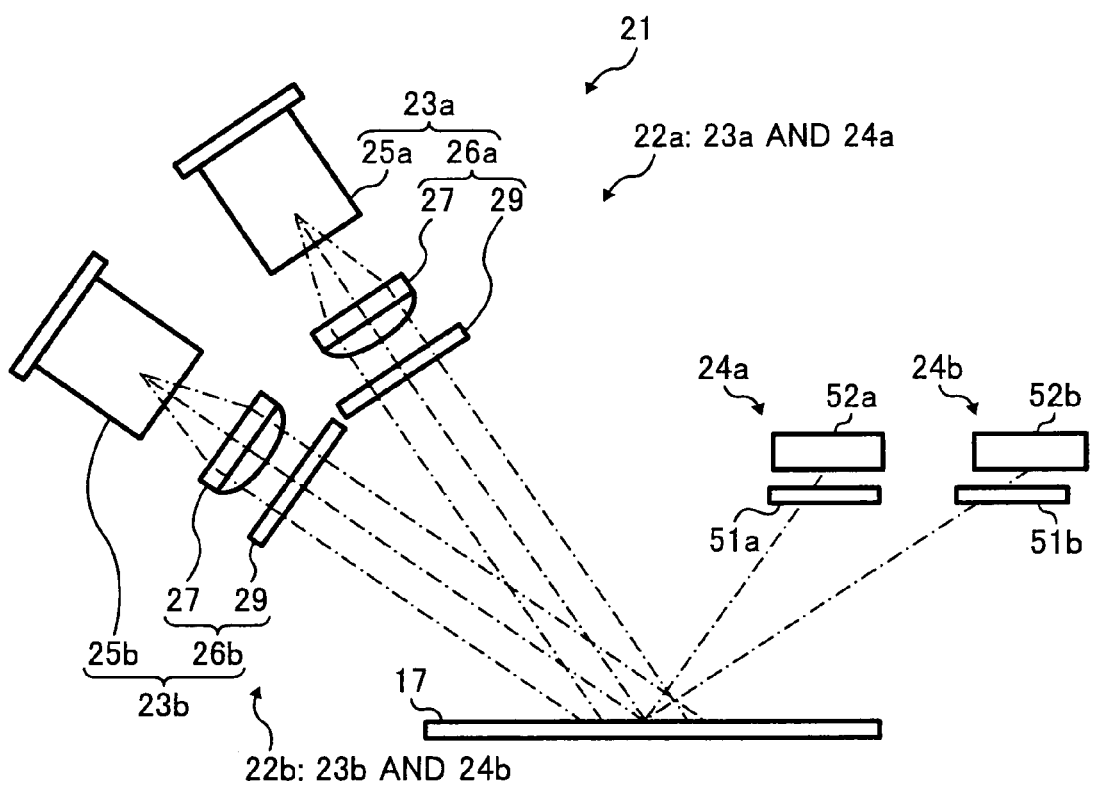
FIG. 19 illustrates a configuration of the mark detector and the scale of FIG. 4.

The mark detector 21 is separated from the conveyance belt 3 by a predetermined distance and faces the scale 17. FIG. 19 illustrates a configuration of the mark detector 21 and the scale 17 of FIG. 4 using a reflective type. This mark detector 21 has, for example, two sets of optical head parts, an optical head part 22a and an optical head part 22b as shown in FIGS. 18 and 19. The optical head part 22a has an illuminator 23a and a photo acceptor 24a. The optical head part 22b has an illuminator 23b and a photo acceptor 24b.

The illuminator 23a has a light source 25a and a beam shaping device 26a. The illuminator 23b has a light source 25b and a beam shaping device 26b. The light source 25a emits a light having a wave length of $\lambda 1$. The light source 25b emits a light having a wave length of $\lambda 2$. A light emitting diode (LED) is used as the light sources 25a and 25b. A semiconductor laser, an electric bulb, or other light emitting device may also be used for the light sources 25a and 25b. Since it is better to use a good parallel light beam, it is preferable to use a light source which has a small luminescence area, such as a semiconductor laser or a point light source LED. The beam shaping devices 26a and 26b condenses the light beam output from the light sources 25a and 25b, and forms a desired light beam form. Each of the beam shaping devices 26a and 26b has the collimating lens 27 and the fixed mask 29 having the slit 28, as shown in FIGS. 19 and 7A. The light beams from the light sources 25a and 25b are condensed to form a parallel beam through the collimating lens 27 and beam-shaped by the fixed mask 29, for example, to form light beam spots 30a and 30b on the scale 17, as shown in FIG. 7B.

The photo acceptor 24a has a wavelength filter 51a and a photo acceptance element 52a. The photo acceptor 24b has a wavelength filter 51b and a photo acceptance element 52b. The wavelength filter 51a may penetrate the light having a wave length of $\lambda 1$ from the light source 25a. The wavelength filter 51b may penetrate the light having a wave length of $\lambda 2$ from the light source 25b. Each of the photo acceptance elements 52a and 52b has a photo-diode or a photo-transistor, etc. The photo acceptance element 52a either accepts a light which penetrates the slit 19 of a scale 17 and the wave length filter 51a, as shown in FIG. 18, or accepts a light which reflects at the reflective mark 18 on a scale 17 and penetrates the wave length filter 51a, as shown in FIG. 19. The photo acceptance element 52b either accepts a light which penetrates the slit 19 of a scale 17 and the wave length filter 51b, as shown in FIG. 18, or accepts a light which reflects at the reflective mark 18 on a scale 17 and penetrates the wave length filter 51b, as shown in FIG. 19. A photoelectric transferring is performed with the photo acceptors 24a and 24b so that a mark detection signal may be acquired. Each of the photo acceptors 24a and 24b is connected to a comparison device 32, such as an amplifier or a comparator of a control section 31 of a drive motor 16 as shown in the block diagram of FIG. 8. In addition, a lens may be provided in the photo acceptors 24a and 24b, which condenses the light that penetrates the slit 19 of a scale 17, or condenses the light reflected by the reflective mark 18.

The illuminators 23a and 23b should be provided in a plane that intersects perpendicularly to a moving direction of the conveyance belt 3 so that each of light axis of the illuminators 23a and 23b may lean against a surface of the conveyance belt 3. By providing the illuminators 23a and 23b in a plane that intersects perpendicularly to a moving direction of the conveyance belt 3, high accuracy mark detecting may be obtained because a light beam from the illuminators 23a and 23b onto the scale 17 is perpendicular to the moving direction of the conveyance belt 3 and an observation position does not change even there is a gap variation between each of the illuminators 23a and 23b and the conveyance belt 3.

The optical head part 22a and the optical head part 22b are provided so that a half cycle distance of reflective marks 18 may pass between the beam spot 30a and the beam spot 30b on the surface of the scale 17 in the moving direction.

A mark detection signal 33a from the photo acceptor 24a and a mark detection signal 33b from the photo acceptor 24b are 180 degrees phase shifted, as shown in FIG. 9. The mark detection signals 33a and 33b are transferred to the binary signals using the comparison device 32, which is used for controlling the drive motor 16.

Since the 180 degrees phase shifted mark detection signals 33a and 33b are acquired and compared by the comparison device 32, the mark detection signals 33a and 33b may change a threshold of a binary signal in the same voltage as the binary signal, as shown in FIG. 9. For example, when the scale 17 has a large reflective unevenness, the mark detection signals 33a and 33b may have an offset variation. But the mark detection signals 33a and 33b come from a penetration light or a reflective light from the adjoining marks on the scale 17, the mark detection signals 33a and 33b may have almost the same level offset variations as convolutions, as shown in FIG. 9. Therefore, a threshold of a binary signal is almost a half amplitude of the mark detection signals 33a and 33b, and a high accuracy binary signal without an offset variation may be obtained. In addition, the wavelength filter 51a may penetrate the light having a wave length of $\lambda 1$ from the light source 25a and the wavelength filter 51b may penetrate the light having a wave length of $\lambda 2$ from the light source 25b, so that the photo acceptors 24a and 24b may accept the light without a light dispersion and may output the mark detection signals 33a and 33b with high S/N.

Furthermore, since the 180 degrees phase shifted mark detection signals 33a and 33b are obtained from an area on the scale 17, a crack or dirty on the scale 17 has little effect to the mark detection signals 33a and 33b and an offset variation is reduced. In addition, since each of the light beams from the illuminators 23a and 23b has a different incidence light angle to the scale 17, an interference of signals may be prevented, mark detecting may be highly accurate.

Not only may a 180 degree phase shift between a plurality of beams be chosen, but also any arbitrary angle, such as 90 degrees, 120 degrees, etc.

The above example also may have a fixed mask 29a including a plurality of slits 28 as shown in FIG. 10A. As shown in FIG. 10B, a plurality of light beam spots 30a and 30b may be irradiated using the fixed mask 29a shown in FIG. 10A so that mark detection signals having a phase shift are acquired. Also in this case, two beam patterns on the scale 17 from the illuminators 23a and 23b do not need to be shifted by the size of the beam pattern, but it may be shifted by an arbitrarily phase difference.

Figure 20:
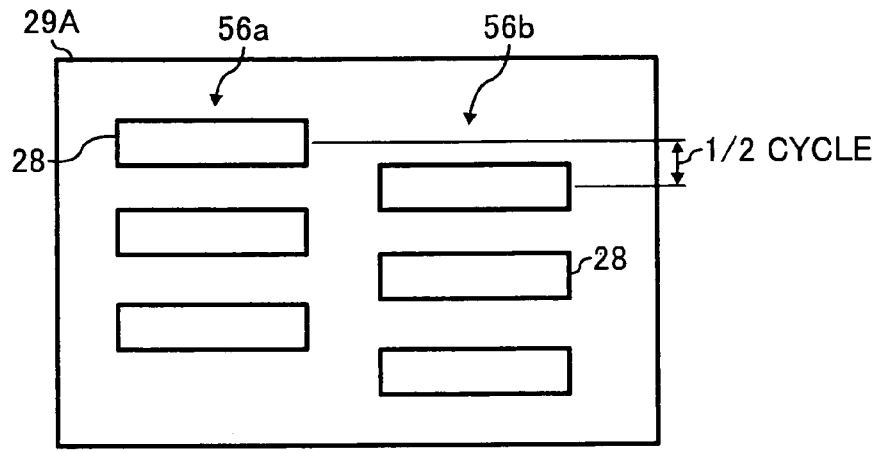
FIG. 20 illustrates another fixed mask used in the mark detector of FIG. 4.
Figure 21:
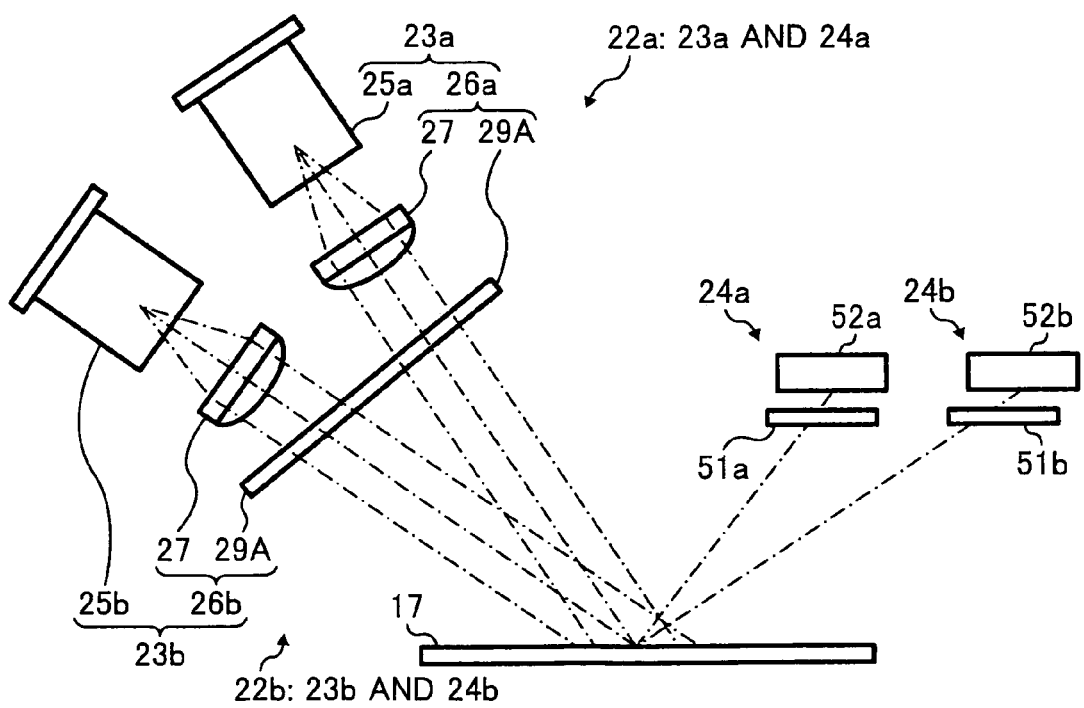
FIG. 21 illustrates another configuration of the mark detector and the scale of FIG. 4.

FIG. 20 illustrates another fixed mask used in a mark detector of FIG. 4. FIG. 21 illustrates another configuration of a mark detector 21 and the scale 17 of FIG. 4. As shown in FIG. 20, a penetration area 56a having slits 28, through which a beam 30a penetrates, and a penetration area 56b having slits 28, through which a beam 30b penetrates, are provided separately in a fixed mask 29A. As shown in FIG. 21, the fixed mask 29A may be used in common as beam shaping devices 26a and 26b of the illuminators 23a and 23b. This common use of the fixed mask 29A may reduce the number of complete parts of the mark detector 21 and make it easy to adjust a phase at the time of assembly.

The above example may also use a photo acceptor 24c in FIG. 13. As shown in FIG. 13, two photo accepting areas 35a and 35b may be provided in a photo acceptor 24c, and the photo acceptor 24c may be used in common in the optical head parts 22a and 22b.

Figure 22:
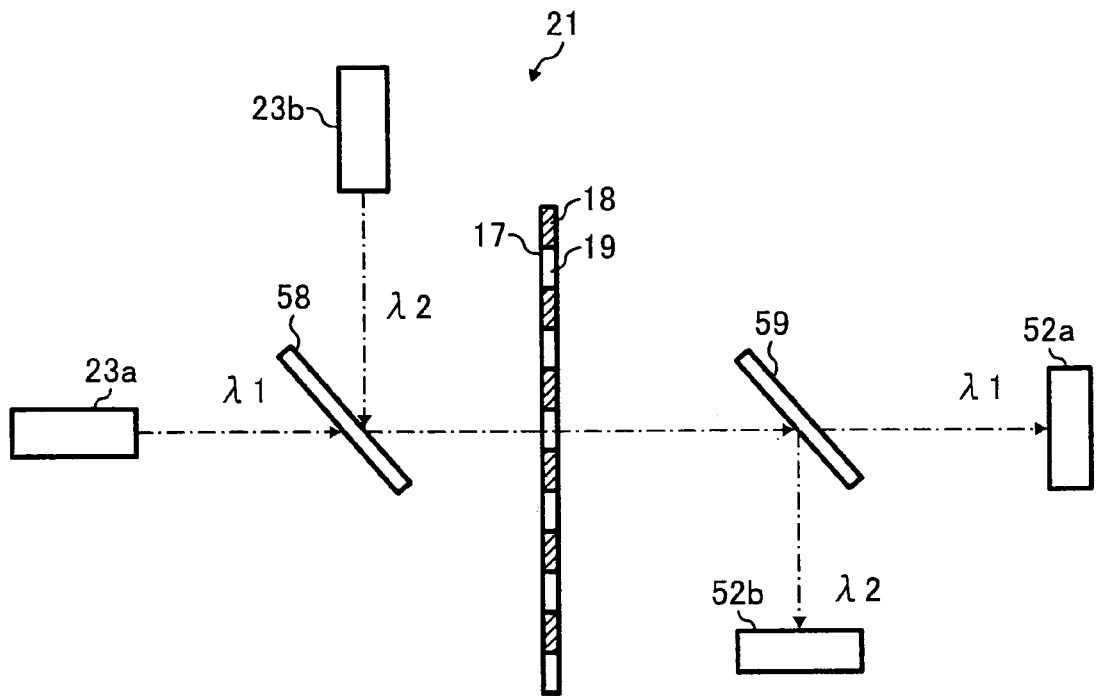
FIG. 22 illustrates another configuration of the mark detector and the scale of FIG. 4.

FIG. 22 illustrates another configuration of a mark detector 21 and the scale 17 of FIG. 4. In the above example, the illuminators 23a and 23b have a different light path. But, in this example, the illuminators 23a and 23b have the same light path in common, as shown in FIG. 22. The illuminator 23a outputs a light having a wave length of λ1. The illuminator 23b outputs a light having a wave length of λ2. The light from the illuminator 23a and the light from the illuminator 23b crosses at a half mirror 58, which selects a wavelength. The light from the illuminator 23a penetrates the half mirror 58, and the light from the illuminator 23b is reflected at the half mirror 58. Then, the light from the illuminator 23a and the light from the illuminator 23b are combined and irradiated onto the scale 17. Further, a penetrated light from the slit 19 of the scale 17 is separated into two lights, one having a wave length of λ1 and the other having a wave length of λ2 at a half mirror 59. A photo acceptance element 52a accepts the light having a wave length of λ1, and a photo acceptance element 52b accepts the light having a wave length of λ2. The half mirrors 58 and 59 may be replaced by a polarization beam splitter that may change a polarization of the light beams from the illuminators 23a and 23b.

The scale 17 may have a height variation and an inclination, however, the light beams having wavelengths of λ1 and λ2 may be irradiated onto the same position on the scale 17. The amount of the light accepted by the photo acceptance elements 52a and 52b is not influenced by a position or an angle change of the scale 17. Therefore, the mark detection signals 33a and 33b with the phase difference output from the photo acceptance elements 52a and 52b may be easier to synchronize and heighten the effect of offset control, and the mark detection signals 33a and 33b with high S/N may be obtained.

Figure 23:
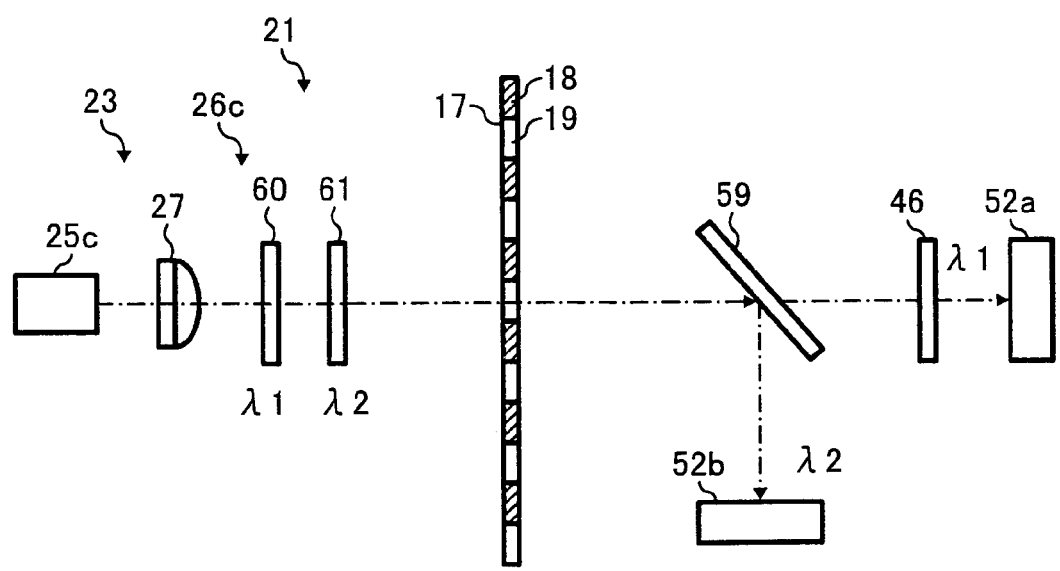
FIG. 23 illustrates another configuration of the mark detector and the scale of FIG. 4.
Figure 24A:
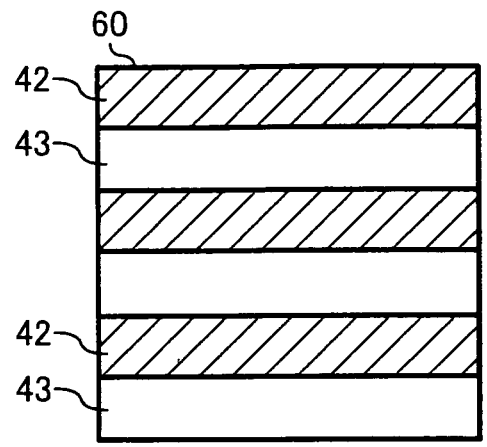
FIG. 24A illustrates a filtering mask used in the mark detector of FIG. 4.
Figure 24B:
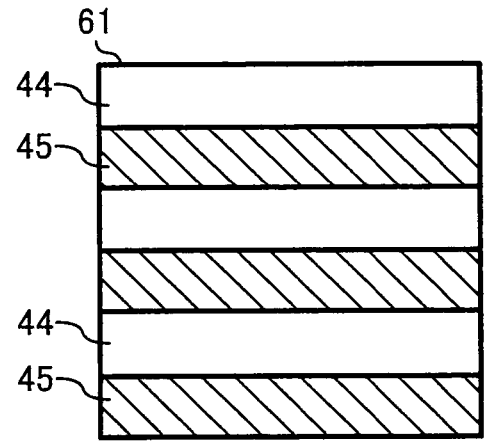
FIG. 24B illustrates a filtering mask used in the mark detector of FIG. 4.

FIG. 23 illustrates another configuration of a mark detector 21 and the scale 17 of FIG. 4. In the above example, the mark detector 21 has two illuminators 23a and 23b. But, in this example, there is only one light source that irradiates light having a plurality of wavelengths. As shown in FIG. 23, an illuminator 23c has an light source 25c capable of irradiating light which has a plurality of wavelengths, such as λ1 and λ2, a beam shaping device 26c including a filtering mask 60 for λ1, and a filtering mask 61 for λ2. As the light source 25c, a single wavelength light may be combined or a light with wavelength distribution may be used. For example, most LED light sources may have a wavelength spread of about 10 nm, so if the filtering masks 60 and 61 and the photo acceptance elements have a sufficient spectral resolution ability, the LED may be used as the light source. FIG. 24A illustrates a filtering mask used in a mark detector of FIG. 4. FIG. 24B illustrates a filtering mask used in a mark detector of FIG. 4. The filtering mask 60 has a wavelength selecting area 42 by a predetermined cycle, which intercepts the λ1 beam and penetrates the λ2 beam, and a penetrating area 43 which penetrates the λ1 and λ2 beams. As shown in FIG. 24b, the filtering mask 61 has a penetrating area 44 that penetrates the λ1 beam and the λ2 beam at the position corresponding to the wavelength selecting area 42, and a wavelength selecting area 45 that intercepts the λ2 beam and penetrates the λ1 beam at the position corresponding to the penetrating area 43. The light beam from the light source 25 is separated into the λ1 beam and the λ2 beam, and the λ1 beam and the λ2 beam that have the same light path may be irradiated onto the scale 17. The penetrated light from the slit 19 may be separated into the λ1 beam and the λ2 beam at the half mirror 59. Then, the λ1 beam is accepted by the photo acceptance element 52a and the λ2 beam is accepted by the photo acceptance element 52b. The spectral resolution ability may be increased by providing a filter 46 that penetrates the λ1 beam between the half mirror 59 and the photo acceptance element 52.

Figure 25:
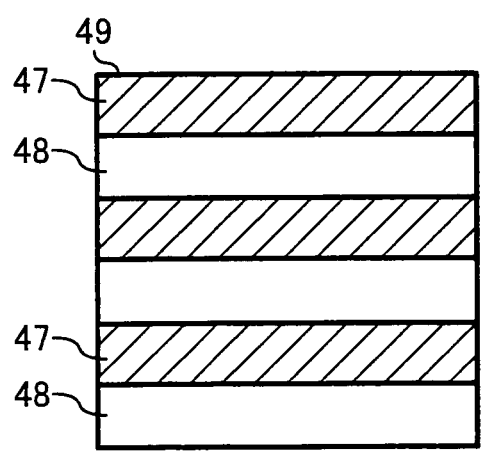
FIG. 25 illustrates a filtering mask used in the mark detector of FIG. 4.

FIG. 25 illustrates a filtering mask used in a mark detector of FIG. 4. A filtering mask 49 has a wavelength selecting area 47 that intercepts the λ1 beam and penetrates the λ2 beam, and a wavelength selecting area 48 that intercepts the λ2 beam and penetrates the λ1 beam. This single filtering mask 49 may separate the light into a λ1 beam and a λ2 beam, and the λ1 beam and the λ2 beam are irradiated along a same light path onto the scale 17.

Since the λ1 beam and the λ2 beam are irradiated along a same light path onto the scale 17 while the λ1 beam and the λ2 beam are phase shifted by 180 degrees, the mark is detected with high accuracy. Further, using the single filtering mask 49 simplifies a configuration of the mark detector 21 and makes it easy to adjust the mark detector 21 because it becomes unnecessary to adjust a plurality of filtering masks.

Figure 26:
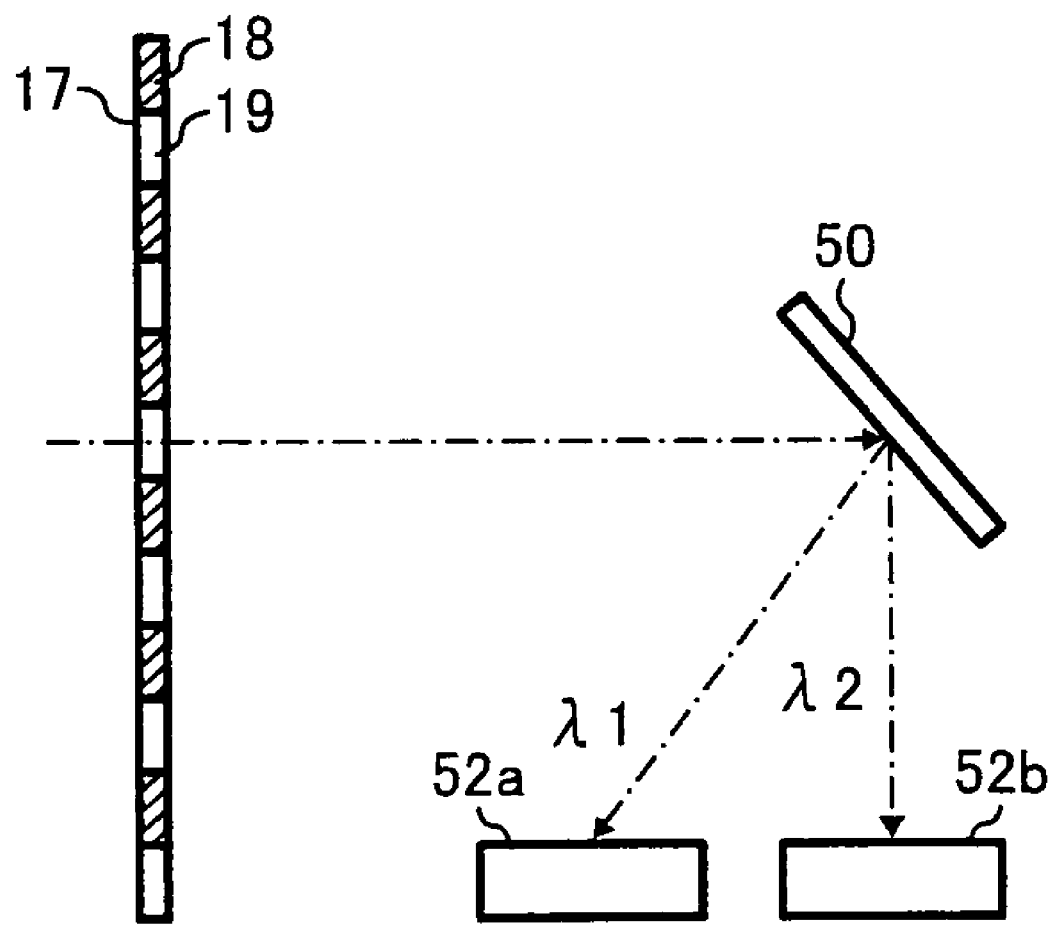
FIG. 26 illustrates another configuration of the mark detector and the scale of FIG. 4.

FIG. 26 illustrates another configuration of a mark detector 21 and the scale 17 of FIG. 4. The light beam penetrated from the slit 19 may be separated using a spectral grating 50 that may change the angle of reflection, as shown in FIG. 26. The separated lights are accepted by the photo acceptance elements 52a and 52b, respectively. Therefore, the photo acceptance elements 52a and 52b may be arranged side by side on one plane, and the mark detector 21 may have a smaller configuration. The spectral grating 50 may be replaced by a penetration type spectral grating.

The mark detector 21 in FIGS. 22 and 23 uses a light beam that penetrates the scale 17, but a reflective light beam from the scale 17 may also be used. Then the reflective light beam may be separated and accepted by the photo acceptance elements 52a and 52b.

As control of the rotation of the conveyance belt 3 is described above, rotation of a photo conductor drum may be also controlled.

Further more, this controlling may also be applied to a various types of measuring equipments to detect a distance of a moving parts, so that high accuracy measuring may be performed stabley.

Numerous additional modifications and variations are possible in light of the above teachings. It is therefore to be understood that within the scope of the appended claims, the disclosure of this patent specification may be practiced otherwise than as specifically described herein.

This patent application is based on and claims priority to Japanese patent applications, No. JPAP2005-301308 filed on Oct. 17, 2005, No. JPAP2005-310907 filed on Oct. 26, 2005, and No. JPAP2006-247469 filed on Sep. 13, 2006, in the Japan Patent Office, the entire contents of each of which are incorporated by reference herein.

What is claimed:

1. A mark detector to detect a plurality of marks which are arranged in a predetermined cycle as a scale on a moving member using a light onto the scale, the mark detector comprising:
    a plurality of optical heads, each of the optical heads including
        an illuminator to irradiate the scale including
            a light source to irradiate a light beam, and
            a beam shaping device to shape the light beam into a predetermined beam, and
        a photo acceptor to accept the light from the scale and transfer the light into an electric signal having a phase that differs from electric signals generated by others of the plurality of optical heads; and
    a comparator to compare the plurality of electric signals received from the photo acceptors in the plurality of optical heads and to convert the electric signals to binary signals,
wherein a plurality of the light beams irradiated from said plurality of illuminators have irradiated positions shifted on the scale and have different angles in a plane perpendicular to a moving direction of the scale.

2. The mark detector of claim 1, wherein the optical heads have a formation in which a plurality of the light beams irradiated from said plurality of illuminators are opposite each other against a normal line of the scale.

3. The mark detector of claim 1, wherein a plurality of the light beams irradiated from said plurality of illuminators have irradiated positions shifted with a half mark cycle on the scale.

4. The mark detector of claim 1, the beam shaping device further comprising:
    a collimating lens to correct the light beam irradiated from the light source into a parallel beam optically; and
    a fixed mask including
        a plurality of slits to penetrate a predetermined light beam from the parallel beams output by the collimating lens.

5. The mark detector of claim 4, wherein the slits are separated in a plurality of areas, and a fixed mask is used to make a plurality of light beams to the scale have a predetermined shape.

6. The mark detector of claim 1, wherein a plurality of the light beams irradiated from said plurality of illuminators have wavelengths different from each other.

7. A displacement detector comprising the mark detector according to claim 1, further comprising:
    a displacement detecting device to calculate displacement of the moving member using the electric signal from the photo acceptor.

8. An image forming apparatus comprising the displacement detector according to claim 7, wherein a photo conductor belt, a photo conductor drum, a transfer belt, a transfer drum, or a sheet conveyance belt is used as the moving member in an image forming mechanism of the image forming apparatus.

9. A mark detector to detect a plurality of marks which are arranged in a predetermined cycle as a scale on a moving member using a light onto the scale, the mark detector comprising:
    a plurality of optical heads, each of the optical heads including
        an illuminator to irradiate the scale including
            a light source to irradiate a light beam,
            an optical separator to separate the light beam irradiated from the light source into a plurality of light beams, and
            a beam shaping device to shape the light beam from the optical separator into a predetermined beam, and
        a photo acceptor to accept the light from the scale and transfer the light into an electric signal;
wherein a least some of the plurality of light beams irradiated from said plurality of illuminators have different angles in a plane perpendicular to a moving direction of the scale, and have irradiated positions shifted within a half mark cycle on the scale.

10. The mark detector of claim 9, the optical separator further comprising:
    a plurality of penetrating and reflecting slits to penetrate and reflect the light beam irradiated from the light source, and
    a mirror to reflect the light beam from the penetrating and reflecting slits.

11. A displacement detector comprising the mark detector according to claim 9, further comprising:
    a displacement detecting device to calculate displacement of the moving member using the electric signal from the photo acceptor.

12. An image forming apparatus comprising the displacement detector according to claim 11, wherein a photo conductor belt, a photo conductor drum, a transfer belt, a transfer drum, or a sheet conveyance belt is used as the moving member in an image forming mechanism of the image forming apparatus.

13. A mark detector to detect a plurality of marks which are arranged in a predetermined cycle as a scale on a moving member using a light onto the scale, the mark detector comprising:
    an illuminator to irradiate the scale including
        a plurality of light sources to irradiate light beams which have different wavelengths from each other,
        a beam shaping device to shape the light beam from each light source into a predetermined shape, and
        an optical combining member to combine the light beams from the beam shaping device into a single light beam; and
    a photo acceptor to accept the light from the scale and transfer the light into an electric signal including
        an optical separator to separate the light beam from the scale into a plurality of light beams which have different wavelengths from each other, and
        a plurality of photo acceptance elements to accept the light beams from the optical separator and to transfer the light into an electric signal.

14. A displacement detector comprising the mark detector according to claim 13, further comprising:

a displacement detecting device to calculate displacement of the moving member using the electric signal from the photo acceptor.

15. An image forming apparatus comprising the displacement detector according to claim 14, wherein a photo conductor belt, a photo conductor drum, a transfer belt, a transfer drum, or a sheet conveyance belt is used as the moving member in an image forming mechanism of the image forming apparatus.

* * * * *